Patented June 12, 1934

1,962,763

UNITED STATES PATENT OFFICE 1,962,763

ADHESIVE AND METHOD OF MAKING SAME

Edward F. Christopher, Chicago, Ill., assignor to Industrial Patents Corporation, Chicago, Ill., a corporation of Delaware No Drawing. Application December 28, 1932, Serial No. 649,233

REISSUED

18 Claims. (Cl. 87—17)

This invention relates to a new and improved composition of matter adapted for use as an adhesive, plastic mass or coating material and suitable for numerous purposes and use in various industrial processes. This invention also relates to a novel process by which a composition of this invention may be produced.

This composition of matter is characterized as made from casein, and biuret and cyanuric acid.

It is an object of this invention to prepare an adhesive from casein which is neutral.

A further object is to prepare a neutral casein adhesive which may be utilized with or without a hardening agent, such as an aldehyde, the use of which will destroy the water solubility of the adhesive and render it more durable and resistant to deterioration and attack by bacteria and the like.

It is a further object of this invention to provide a casein adhesive which is water soluble and which may be prepared initially in solution as a liquid or paste or if desired, in the form of a powder which is sold dry and prepared for use, merely by the addition of water.

It has been well known prior to this invention that casein adhesives exhibit high adhesive properties. However, inasmuch as casein is insoluble in water and its use heretofore has involved the use of alkalis, casein adhesives have been unsuitable in many uses as substitutes for vegetable and animal glues. It is well known that alkalis tend to discolor and in many cases, destroy paper, and other objects to which the adhesive is applied. Furthermore, many of these prior art casein adhesives are subject to destructive action of bacteria when in solution, and the joints made therefrom are comparatively easily soluble in water.

As an improvement over the casein adhesives utilizing alkaline solutions as dissolving mediums, there is disclosed in Patent No. 1,725,805, Landecker, issued August 27th, 1929, an adhesive prepared from casein and urea. This preparation is an improvement over the alkali solutions in that it is neutral and further, in that it is subject to being hardened or rendered water insoluble by the action of an aldehyde so as to prevent the taking up of water such as might subject the casein to the destructive action of bacteria.

The applicant has found however, with adhesives made from casein and urea, that in those cases where it may be necessary or desirable, from the standpoint of commercial practice, to subject the adhesive to heat, or to boil the adhesive alone or with other substances, that the urea will hydrolize, and give off objectionable ammonia fumes. Also an adhesive of casein and urea is subject to attack by certain enzymes such as urease enzymes which contaminate the air and produce by their attack, an undesirable decomposition of the urea.

Accordingly it is a further object of this invention to prepare an adhesive which possesses the advantages but is free from the objections stated for urea, whereby it is neutral but will not give off ammonia fumes as above described and will not be subject to attack by urease enzymes with resulting decomposition of the urea constituent.

In furtherance of the above stated objects, it is also an object of the present invention to provide casein adhesives which are transparent, free from odors, and adapted for various industrial uses, particularly in connection with edible foodstuffs, wherein it is highly important that the adhesive be free from odors or any other influence that would contaminate or in any wise effect the food product.

These and other objects not specifically enumerated are contemplated for this invention as will readily appear to one skilled in the art as the following description proceeds.

The present invention is based upon the discovery that a clear neutral casein solution may be readily produced by dissolving casein in an aqueous solution of biuret, or more specifically, biuret, cyanuric acid, and perhaps also, ammonia salts of cyanuric acid. Furthermore, either rennet casein or acid casein may be used in the preparation of this solution whereas heretofore, with alkaline solvents, only acid casein has been usable. Casein completely dissolves in a short time in the cold aqueous solution of biuret and cyanuric acid and although variable quantities of casein may be employed with success, casein may be added in equal quantity by weight to the quantity of biuret and cyanuric acid employed.

It is to be understood that this invention contemplates the use of pure biuret as the dissolving agent for the casein but inasmuch as pure biuret is relatively expensive to obtain, it is intended that a mixture of biuret and cyanuric acid be employed. This mixture serves admirably in accomplishing the objects of this invention. It is well known that in the preparation of biuret, cyanuric acid is also formed and perhaps a small quantity of ammonia, and in addition, some ammonia salt of cyanuric acid. The invention therefore contemplates the use of these substances in combination because in practice they are found to give the desirable results here claimed. However, if it is preferred, the biuret may be treated for the elimination of the cyanuric acid and its ammonia salts and used in its pure state with an equal degree of success.

Purely by way of example, this invention may be practiced by, first, preparing the dissolving re-agent for the casein by gradually heating dry urea until it reaches a temperature of approximately 160 degrees C. At 132 degrees C. the urea melts and at from 150 to 170 degrees C. it decomposes and gives off ammonia gas. After the urea has melted the product is agitated frequently while heating and the heating continued for several hours. The time required to raise the temperature to 160 degrees C. depends upon the amount of urea used and the source of heat employed. By way of illustration, when using approximately 1.5 pounds of urea and utilizing an oil bath, the time required to raise the temperature to 160 degrees C. is approximately two hours. Thereafter, heating of the urea is continued at between 150 to 170 degrees C. for approximately two hours longer whereby the total heat treatment is conducted for about four hours. At this point air is blown through the melted mass to remove any ammonia which may be present. The melted mixture so prepared which is known to contain biuret, cyanuric acid and ammonia or ammonia salts of cyanuric acid is then poured onto a slab or tray and allowed to cool and harden. The dry, hard product is then removed and ground to a powder in which form it is ready for use in preparing the casein solution.

The second step is the preparation of the casein solution. One preferred method involves the use of 100 parts by weight of casein (preferably 70 mesh) 100 parts of the dissolving re-agent prepared as above described, and 200 parts water. The ingredients are first mixed and heated in a jacketed kettle or steam bath to a temperature approaching but not above 100 degrees C. until a smooth, viscous solution is obtained. The solution is then allowed to stand until cool and to permit the escape of air which is incorporated during the mixing. This period will vary according to the treatment employed but if allowed to stand without special treatment, the mass will be cooled and freed of air in approximately sixteen hours.

It is to be understood that the adhesive is in the nature of a colloidal suspension and accordingly the ingredients may be varied throughout wide limits whereby the invention is not to be restricted to any exact proportions. In fact, it is found that with the dissolving re-agent here specified, only a relatively small amount of casein need be employed in order to give the adhesive solution relatively high adhesive properties.

It is to be understood that the adhesive may be used for any and all commercial and industrial purposes but it may be mentioned that it has special usefulness in connection with the preparation of certain food products such as for instance, the gluing of normal cellophane in making artificial sausage casings or similar or analogous uses.

Furthermore, according to the proportions employed in the concentration of the solution, an adhesive can be obtained of any desired consistency, such as a relatively thin liquid or a paste of substantial viscosity. Furthermore, it is entirely practical to prepare the solid ingredients in the form of a dry powder which may be sold on the market as such and thereafter prepared for use by the addition of the desired quantity of water. It is found that by the addition of water to the dry, powdered ingredients, that the casein is caused to readily dissolve to form the desired adhesive composition.

In addition, the adhesive of this invention may be treated for the purpose of altering its water solubility after its application or use, whereby the adhesive is rendered more stable and free from attack by bacteria or the like. This may be accomplished by reacting with an aldehyde which acts chemically therewith to destroy the water solubility of the adhesive.

The exact chemical reaction is not understood but it is known that the solubility of the product can be materially reduced in this way. This offers a substantial improvement over various prior practices where various different methods were attempted which in most cases, would only penetrate the edges of the applied adhesive.

In the present invention, when the adhesive is in the form of a solution, a solution of formaldehyde may be employed or when the adhesive is prepared as a dry powder, a solid polymer of formaldehyde, such as para-formaldehyde, may be added to the solid mixture. The presence of formaldehyde in the mixture offers the advantage of being thoroughly incorporated throughout the entire adhesive mass whereby its action upon the mixture in rendering it water insoluble is more completely and satisfactorily effected.

I claim:

1. An adhesive mixture comprising casein, biuret, and water.

2. An adhesive mixture comprising casein, biuret, an aldehyde and water.

3. An adhesive mixture comprising casein, biuret, formaldehyde and water.

4. An adhesive mixture comprising casein, biuret, cyanuric acid, and water.

5. An adhesive mixture comprising casein, biuret, cyanuric acid, an aldehyde, and water.

6. An adhesive mixture comprising casein, biuret, cyanuric acid, formaldehyde, and water.

7. A new composition of matter comprising a powdered mixture of casein and biuret adapted to form an adhesive upon the addition of water.

8. A new composition of matter comprising a powdered mixture of casein, biuret and cyanuric acid adapted to form an adhesive upon the addition of water.

9. A new composition of matter comprising a powdered mixture of casein, biuret, and an aldehyde adapted to form an adhesive upon the addition of water.

10. A new composition of matter comprising a powdered mixture of casein, biuret, cyanuric acid, and an aldehyde adapted to form an adhesive upon the addition of water.

11. A new composition of matter comprising a powdered mixture of casein, biuret, and formaldehyde adapted to form an adhesive upon the addition of water.

12. A new composition of matter comprising a powdered mixture of casein, biuret, cyanuric acid, and formaldehyde, adapted to form an adhesive upon the addition of water.

13. The process of preparing a neutral casein solution adapted for use as an adhesive, which consists in dissolving biuret in water, and then dissolving casein in the solution so prepared.

14. The process of preparing a neutral casein solution adapted for use as an adhesive, which consists in dissolving biuret and cyanuric acid in water and then dissolving casein in the solution so prepared.

15. The process of preparing a neutral casein solution adapted for use as an adhesive, which consists in dissolving biuret in water, and then dissolving casein in the solution so prepared and finally hardening said adhesive by reacting with an aldehyde.

16. The process of preparing a neutral casein solution adapted for use as an adhesive, which consists in dissolving biuret in water, and then dissolving casein in the solution so prepared and finally hardening said adhesive by reacting with formaldehyde.

17. The process of preparing a neutral casein solution adapted for use as an adhesive, which consists in dissolving biuret and cyanuric acid in water, and then dissolving casein in the solution so prepared and finally hardening said adhesive by reacting with an aldehyde.

18. The process of preparing a neutral casein solution adapted for use as an adhesive, which consists in dissolving biuret and cyanuric acid in water, and then dissolving casein in the solution so prepared and finally hardening said adhesive by reacting with formaldehyde.

EDWARD F. CHRISTOPHER.